(12) United States Patent
An et al.

(10) Patent No.: US 9,732,991 B2
(45) Date of Patent: Aug. 15, 2017

(54) MOTOR DRIVING DEVICE AND AIR CONDITIONER INCLUDING THE SAME

(71) Applicant: LG ELECTRONICS INC., Seoul (KR)

(72) Inventors: Joonsik An, Seoul (KR); Sangyoung Kim, Seoul (KR); Taeyoung Park, Seoul (KR); Kyungmin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/582,905

(22) Filed: Dec. 24, 2014

(65) Prior Publication Data
US 2015/0180384 A1 Jun. 25, 2015

(30) Foreign Application Priority Data

Dec. 24, 2013 (KR) .................. 10-2013-0162826
Sep. 1, 2014 (KR) .................. 10-2014-0115600
Oct. 24, 2014 (KR) .................. 10-2014-0145025

(51) Int. Cl.
| | |
|---|---|
| H02P 27/04 | (2016.01) |
| F25B 1/00 | (2006.01) |
| H02M 1/42 | (2007.01) |
| H02M 5/44 | (2006.01) |
| H02P 6/28 | (2016.01) |

(52) U.S. Cl.
CPC ........... *F25B 1/005* (2013.01); *H02M 1/4225* (2013.01); *H02M 5/44* (2013.01); *H02P 6/28* (2016.02); *Y02B 70/126* (2013.01)

(58) Field of Classification Search
CPC ........ H02P 27/08; H02P 27/06; Y02B 70/126; H02M 1/4225; H02M 3/1584; Y10T 307/406
USPC ........................................................ 318/800
See application file for complete search history.

(56) References Cited

U.S. PATENT DOCUMENTS

| | | | | |
|---|---|---|---|---|
| 5,321,599 | A * | 6/1994 | Tanamachi et al. | H02M 7/487 318/811 |
| 5,504,667 | A * | 4/1996 | Tanaka | H02M 5/4505 363/37 |
| 6,244,061 | B1 * | 6/2001 | Takagi | F25B 49/025 62/228.4 |
| 2002/0036911 | A1 * | 3/2002 | Okui | H02J 9/062 363/95 |
| 2003/0090231 | A1 * | 5/2003 | Yoshimoto | H02P 21/0035 318/635 |

(Continued)

FOREIGN PATENT DOCUMENTS

| | | |
|---|---|---|
| DE | 102007058969 A1 | 6/2008 |
| EP | 0695024 B1 | 2/2003 |

(Continued)

*Primary Examiner* — Eduardo Colon Santana
*Assistant Examiner* — Gabriel Agared
(74) *Attorney, Agent, or Firm* — Dentons US LLP

(57) ABSTRACT

A motor driving device includes a rectifier to rectify inputted alternating current (AC) power, a boost converter to boost and to output the power rectified by the rectifier, and an inverter including a plurality of switching devices to output converted AC power to a motor using a voltage from the boost converter. Accordingly, a voltage utilization ratio of a voltage input to an inverter in the motor driving device using a low-capacitance capacitor is enhanced.

14 Claims, 16 Drawing Sheets

(56) References Cited

U.S. PATENT DOCUMENTS

| | | | |
|---|---|---|---|
| 2006/0273748 A1* | 12/2006 | Yoshimoto | B60L 15/025 318/432 |
| 2007/0103947 A1* | 5/2007 | Taguchi | H02M 1/12 363/45 |
| 2011/0132899 A1* | 6/2011 | Shimomugi | H02M 3/1584 219/620 |
| 2013/0043847 A1 | 2/2013 | Kim | |

FOREIGN PATENT DOCUMENTS

| | | |
|---|---|---|
| EP | 2393200 A1 | 12/2011 |
| EP | 2660962 A2 | 11/2013 |

\* cited by examiner (a)　　　　　　　　　　(b)

(a)

(b)

FIG. 10B
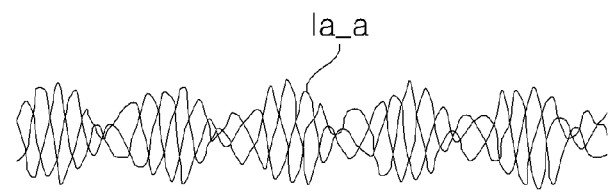
(a)
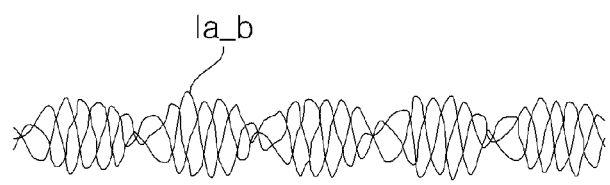
(b)
FIG. 11
1100
| INPUT RATIO OF FUNDAMENTAL WAVE (K1) | INPUT RATIO OF SECOND ORDER HIGHER HARMONIC (K2) | INPUT RATIO OF THIRD ORDER HIGHER HARMONIC (K3) | VDC Peak | CONTROL OF VDC PEAK REDUCTION | CALCULATION ERROR |
|---|---|---|---|---|---|
| 1.00 | 0 | 0.00 | 451 | 451 | 0.00 |
| 0.97 | 0 | 0.03 | 430.7 | 426 | −4.72 |
| 0.94 | 0 | 0.06 | 410.7 | 404 | −7.19 |
| 0.91 | 0 | 0.09 | 390.7 | 390 | −0.99 |
| 0.86 | 0.02 | 0.12 | 370.7 | 365 | −5.70 |
| 0.81 | 0.04 | 0.15 | 350.7 | 346 | −4.70 |

(a)

(b)

MOTOR DRIVING DEVICE AND AIR CONDITIONER INCLUDING THE SAME

CROSS-REFERENCE TO RELATED APPLICATION

This application claims the priority benefit of Korean Patent Application Nos. 10-2013-0162826, filed on Dec. 24, 2013, 10-2014-0115600, filed on Sep. 1, 2014 and 10-2014-0145025, filed on Oct. 24, 2014 in the Korean Intellectual Property Office, which are incorporated herein by reference.

BACKGROUND

1. Field of the Disclosure

The present disclosure relates to a motor driving device and an air conditioner including the same, and more particularly, to a motor driving device and an air conditioner including the same, for enhancing a voltage utilization ratio of a voltage input to an inverter in the motor driving device using a low-capacitance capacitor.

2. Background

An air conditioner is installed to provide a more pleasant indoor environment to a human by discharging cooled air into an interior of a room, adjusting indoor temperature, and purifying indoor air. In general, an air conditioner includes an indoor unit composed of a heat exchanger and installed indoors, and an outdoor unit composed of a compressor, a heat exchanger, etc., and supplying refrigerant to the indoor unit.

SUMMARY

Therefore, in view of the above problems, one object is to provide a motor driving device and an air conditioner including the same, for enhancing a voltage utilization ratio of a voltage input to an inverter in the motor driving device using a low-capacitance capacitor.

Another object is to provide a motor driving device and an air conditioner including the same, for reducing a maximum voltage between DC terminals in the motor driving device using a low-capacitance capacitor and a boost converter.

Another object is to provide a motor driving device and an air conditioner including the same, for achieving stable driving with respect to a load in the motor driving device using a low-capacitance capacitor and a boost converter.

In accordance with one aspect, a motor driving device includes a rectifier to rectify inputted alternating current (AC) power, a boost converter to boost and to output the power rectified by the rectifier, and an inverter including a plurality of switching devices to output converted AC power to a motor using a voltage from the boost converter.

In accordance with another aspect, a motor driving device includes a rectifier to rectify inputted alternating current (AC) power, a boost converter to boost and to output the power rectified by the rectifier, a capacitor to store a ripple voltage outputted from the boost converter, an inverter including a plurality of switching devices to output converted AC power to a motor using the ripple voltage, and a converter controller to control the boost converter to reduce a peak value of the ripple voltage using a higher harmonic compared with a fundamental wave of an input voltage, the higher harmonic corresponding to a phase of the input voltage.

In accordance with a further aspect, an air conditioner includes a compressor to compress refrigerant, a heat exchanger to perform heat exchange using the compressed refrigerant, and a compressor motor driving device to drive a motor in the compressor, wherein the compressor motor driving device includes a rectifier to rectify input alternating current (AC) power, a boost converter to boost and to output the power rectified by the rectifier, and an inverter including a plurality of switching devices to output converted AC power to a motor using a voltage from the boost converter.

BRIEF DESCRIPTION OF THE DRAWINGS

The above and other objects, features and other advantages will be more clearly understood from the following detailed description taken in conjunction with the accompanying drawings, in which:

FIG. 10B illustrates a phase current shape Ia_a flowing in the motor before and after a higher harmonic is injected;

FIG. 11 is a table of a ratio of K1, K2, and K3 determined by a higher harmonic generator of FIG. 7, which may be stored in the higher harmonic generator;

DETAILED DESCRIPTION OF THE PREFERRED EMBODIMENTS

Exemplary embodiments of the present invention will be described with reference to the attached drawings.

The suffixes "module" and "unit" of elements herein are used for convenience of description and do not have any distinguishable meanings or functions. Thus, the suffixes "module" and "unit" can be used interchangeably. Further, these terms can refer to hardware or a controller that executes instructions stored in a memory.

Figure 1:
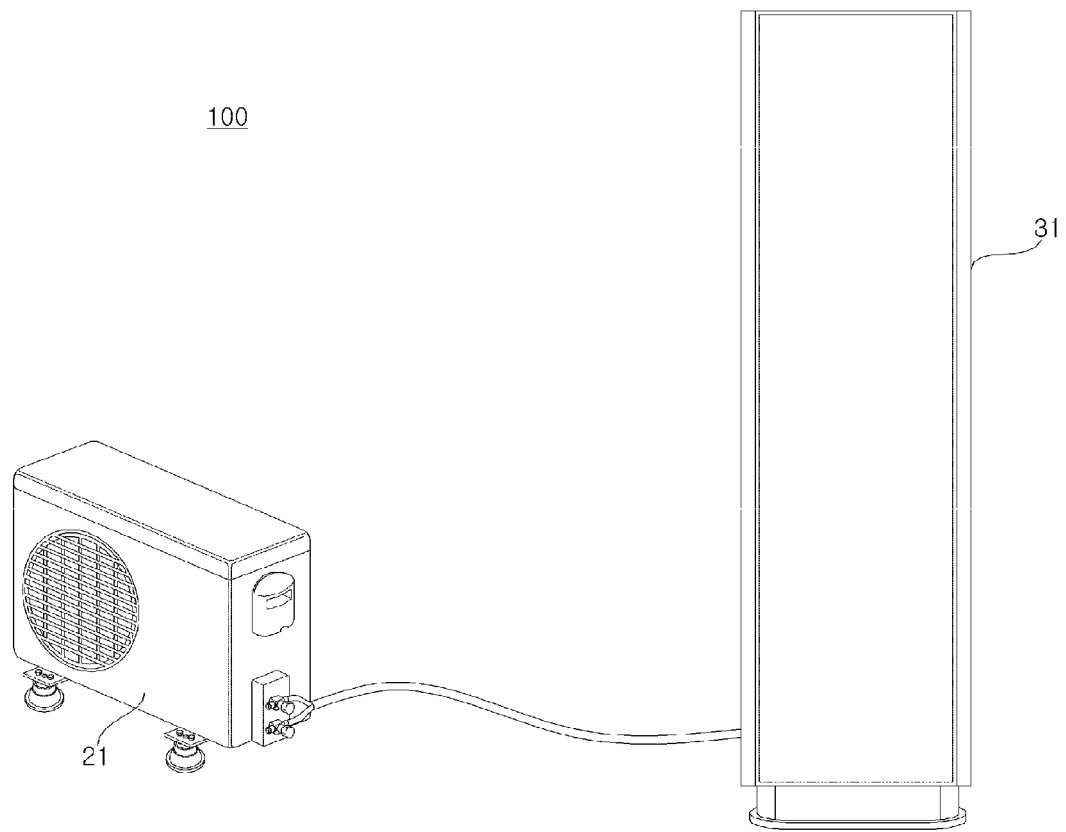
FIG. 1 is a diagram illustrating a structure of an air conditioner according to an embodiment of the present invention.

FIG. 1 is a diagram illustrating a structure of an air conditioner 100 according to an embodiment of the present invention.

As illustrated in FIG. 1, the air conditioner 100 according to the embodiment of the present invention may include an indoor unit 31 and an outdoor unit 21 connected to the indoor unit 31.

Although the indoor unit 31 of the air conditioner 100 is applicable to any of a stand type air conditioner, a wall mounted air conditioner, and a ceiling type air conditioner, FIG. 1 illustrates the case in which the indoor unit 31 is of a stand type.

The air conditioner 100 may further include at least one of a ventilator, an air cleaner, a humidifying device, and a heater, and may operate in conjunction with operations of the indoor unit 31 and the outdoor unit 21.

The outdoor unit 21 includes a compressor (not shown) for receiving and compressing refrigerant, an outdoor heat exchanger (not shown) for performing heat exchange between the refrigerant and outdoor air, an accumulator (not shown) for extracting gas refrigerant from the supplied refrigerant and supplying the gas refrigerant to the compressor, and a four-way valve (not shown) for selecting a flow path of the refrigerant according to a heating/cooling operation. In addition, the outdoor unit 21 may further include a plurality of sensors, a valve, an oil collector, etc., but a description thereof will be omitted here.

The outdoor unit 21 operates the compressor and outdoor heat exchanger included therein to compress refrigerant or to perform heat exchange according to setting and supplies the refrigerant to the indoor unit 31. The outdoor unit 21 may be driven according to a demand of the indoor unit 31 or a remote controller (not shown). In this case, it may be possible to vary the number of operations of the outdoor unit and the number of operations of the compressor installed in the outdoor unit along with variance in cooling/heating capacity according to the driven indoor unit.

In this case, the outdoor unit 21 supplies the compressed refrigerant to the indoor unit 31 connected thereto.

The indoor unit 31 receives the refrigerant from the outdoor unit 21 and discharges cooled air to the interior of the room. The indoor unit 31 includes an indoor heat exchanger (not shown), an indoor unit fan (not shown), an expansion valve (not shown) for expanding the supplied refrigerant, and a plurality of sensors (not shown). In this case, the outdoor unit 21 and the indoor unit 31 may be connected to each other via a communication line, may transmit and receive data to and from each other, may be connected to a remote controller (not shown) by wire or wirelessly, and operated according to a control of the remote controller (not shown).

A remote controller (not shown) may be connected to the indoor unit 31, may input a user's control command to the indoor unit, and may receive and display state information of the indoor unit. In this case, the remote controller may communicate with the indoor unit by wire or wirelessly according to the connection form with the indoor unit.

Figure 2:
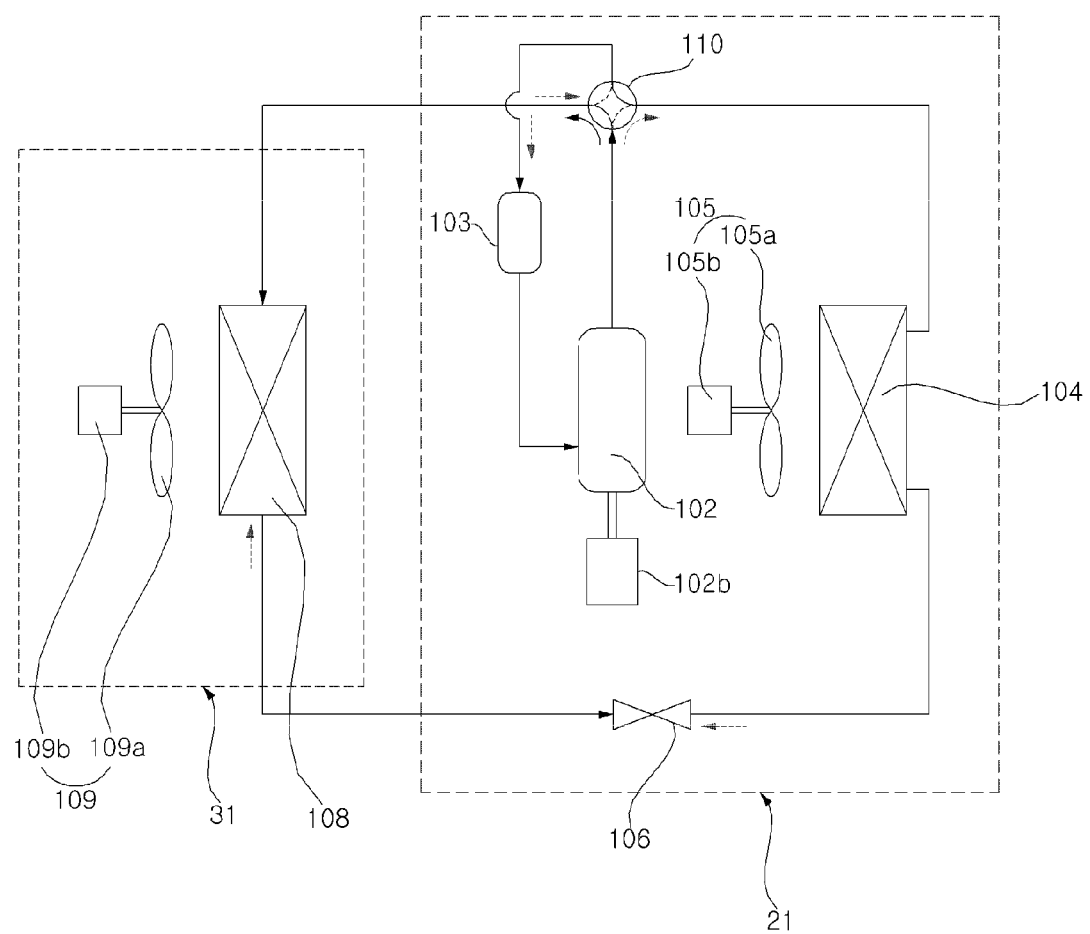
FIG. 2 is a schematic diagram of an outdoor unit and an indoor unit of FIG. 1.

FIG. 2 is a schematic diagram of the outdoor unit 21 and the indoor unit 31 of FIG. 1.

Referring to FIGS. 1 and 2, the air conditioner 100 includes the indoor unit 31 and the outdoor unit 21.

The outdoor unit 21 includes a compressor 102 for compressing refrigerant, an electric motor 102b for a compressor for driving the compressor, an outdoor heat exchanger 104 for heat dissipation of the compressed refrigerant, an outdoor blower 105 disposed at one side of the outdoor heat exchanger 104 and including an outdoor fan 105a for facilitation of heat dissipation of refrigerant and an electric motor 105b for driving the outdoor fan 105a, an expansion device 106 for expansion of condensed refrigerant, a cooling/heating reversing (four-way) valve 110 for changing a flow path of the compressed refrigerant, an accumulator 103 for temporally storing the vaporized refrigerant, removing moisture and impurities from the refrigerant, and then supplying the refrigerant at predetermined pressure into the compressor, and so on.

The indoor unit 31 includes an indoor heat exchanger 108 installed indoor and performing a cooling/heating function, an indoor blower 109 disposed at one side of the indoor heat exchanger 108 and including an indoor fan 109a for facilitation of heat dissipation of refrigerant and an electric motor 109b for driving the indoor fan 109a, and so on.

At least one indoor heat exchanger 108 may be installed. As the compressor 102, at least one of an inverter compressor and a constant speed compressor may be used.

In addition, it may be possible that the air conditioner 100 is composed of a cooler for cooling indoor air or a heat pump for cooling or heating indoor air.

The compressor 102 in the outdoor unit 21 of FIG. 1 may be driven by a compressor motor driving device 200 (refer to FIG. 3) for driving a compressor motor 250.

Figure 3:
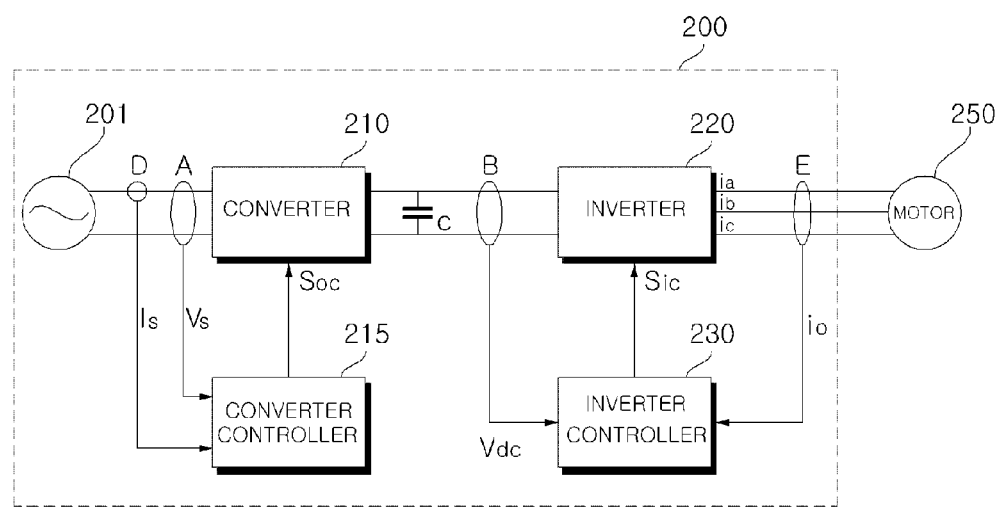
FIG. 3 is a block diagram of a compressor motor driving device of the outdoor unit of FIG. 1.
Figure 4:
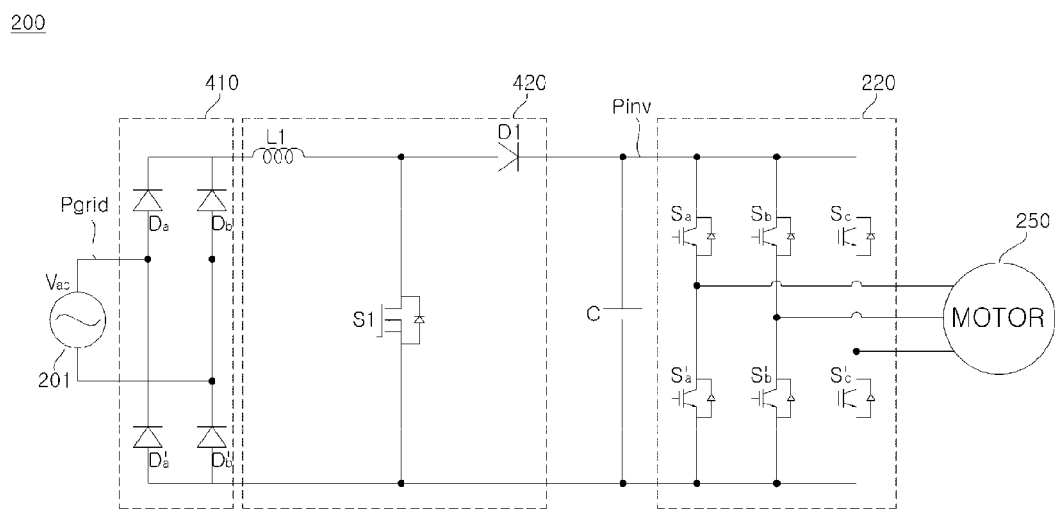
FIG. 4 is a circuit diagram of an example of the compressor motor driving device of FIG. 3.

FIG. 3 is a block diagram of a compressor motor driving device 200 of the outdoor unit 21 of FIG. 1. FIG. 4 is a circuit diagram of an example of the compressor motor driving device 200 of FIG. 3.

Referring to FIGS. 3 and 4, the compressor motor driving device 200 may include an inverter 220 for outputting three-phase alternating current (AC) to the compressor motor 250, an inverter controller 230 for controlling the inverter 220, a converter 210 for supplying direct current (DC) power to the inverter 220, a converter controller 215 for controlling the converter 210, and a DC terminal capacitor C between the converter 210 and the inverter 220. The compressor motor driving device 200 may further include a DC voltage detector B, an input voltage detector A, an input current detector D, and an output current detector E.

The compressor motor driving device 200 receives AC power from a system, converts the AC power, and supplies the converted power to the motor 250. Accordingly, the compressor motor driving device 200 may be referred to as a power converting device.

A compressor motor driving device 200 according to an embodiment of the present invention may use the DC terminal capacitor C with low capacitance of several tens of µF or less. For example, the DC terminal capacitor C with low capacitance may include a film capacitor that is not an electrolytic capacitor.

When a low capacitance capacitor is used, a DC terminal voltage increasingly fluctuates and ripples, and thus a smoothing operation is barely performed.

The motor driving device with the DC terminal capacitor C with low capacitance of several tens of µF or less may be referred to as a capacitorless base motor device.

Throughout this specification, embodiments of the present invention will be described in terms of the motor driving device 200 including the DC terminal capacitor C with low capacitance.

The converter 210 converts input AC power into DC power. The converter 210 includes a rectifier 410 and a boost converter 420. Input power based on input AC power may be referred to as Pgrid.

The rectifier 410 receives and rectifies single-phase AC power 201 and outputs the rectified power.

To this end, the rectifier 410 is exemplified in such a way that upper arm diode devices Da and Db and lower arm diode devices D'a and D'b are connected to each other in series, respectively to constitute one pair and total two pairs of upper and lower diode devices are connected in parallel to each other (Da&D'a and Db&D'b). That is, the upper and lower diode devices may be connected in the form of a bridge.

The boost converter 420 includes an inductor L1 and a diode D1 that are connected in series to each other between the rectifier 410 and the inverter 220, and a switching device S1 connected between the inductor L1 and the diode D1. When the switching device S1 is turned on, energy may be stored in the inductor L1, and when the switching device S1 is turned off, the energy stored in the inductor L1 may be outputted through the diode D1.

In particular, with regard to the compressor motor driving device 200 using the DC terminal capacitor C with low capacitance, a voltage obtained by boosting a predetermined voltage, that is, an offset voltage may be outputted from the boost converter 420.

The converter controller 215 may control turn-on timing of the switching device S1 in the boost converter 420. Accordingly, the converter controller 215 may output a converter switching control signal Scc for turning on the switching device S1.

To this end, the converter controller 215 may receive an input voltage Vs and input current Is from the input voltage detector A and the input current detector D, respectively.

The input voltage detector A may detect the input voltage from the input AC power 201. For example, the input voltage detector A may be disposed in front of the rectifier 410.

The input voltage detector A may include a resistor device, an operational amplifier (OP AMP), and so on for voltage detection. The detected input voltage Vs may be a pulse type of discrete signal and may be applied to the converter controller 215 in order to generate a converter switching control signal Scc.

A zero crossing point of an input voltage may be detected by the input voltage detector A.

Then the input current detector D may detect the input current Is from the input AC power 201. In detail, the input current detector D may be disposed in front of the rectifier 410.

The input current detector D may include a current sensor, a current transformer (CT), a shunt resistor, and so on for current detection. The detected input current Is may be a pulse type of discrete signal and may be applied to the converter controller 215 in order to generate a converter switching control signal Scc.

The DC voltage detector B detects a ripple voltage Vdc of the DC terminal capacitor C. For power detection, a resistor device, an OP AMP, and so on may be used. The detected voltage Vdc of the DC terminal capacitor C may be a pulse type discrete signal and may be applied to the inverter controller 230. An inverter switching control signal Sic may be generated based on the DC voltage Vdc of the DC terminal capacitor C.

Unlike in the drawings, the detected DC voltage may be applied to the converter controller 215 and used to generate the converter switching control signal Scc.

The inverter 220 may include a plurality of inverter switching devices, convert smoothed DC power Vdc into three-phase AC power according to an on/off operation of a switching device, and output the three-phase AC power to the three-phase motor 250.

Accordingly, the inverter 220 may supply inverter power Pinv to the motor 250 as a load. In this case, the inverter power Pinv may be power required by the motor 250 as a load and may track required target power. Thus, in various embodiments of the present invention, the inverter power Pinv may have the same concept as the target power required by a load.

In detail, the inverter 220 may include a plurality of switching devices. For example, upper arm switching devices Sa, Sb, and Sc and lower arm switching devices S'a, S'b, and S'c are connected in series to each other, respectively to constitute one pair and a total of three pairs of upper and lower switching devices are connected to each other in parallel (Sa&S'a, Sb&S'b, and Sc&S'c). In addition, a diode may be connected in inverse-parallel to each of the switching devices Sa, S'a, Sb, S'b, Sc, and S'c.

The inverter controller 230 may output the inverter switching control signal Sic to the inverter 220 in order to control a switching operation of the inverter 220. The inverter switching control signal Sic may be a switching control signal of a pulse width modulation (PWM) scheme and may be generated and outputted based on output current io flowing in the motor 250 and the DC terminal voltage Vdc between opposite terminals of a DC capacitor. In this case, the output current io may be detected from an output current detector E and the DC terminal voltage Vdc may be detected from the DC terminal voltage detector B.

The output current detector E may detect the output current io flowing between the boost converter 420 and the motor 250. That is, the output current detector E may detect current flowing into the motor 250. The output current detector E may detect all three phases of output currents ia, ib, and is or detect two phases of output currents using ternary phase equilibrium.

The output current detector E may be disposed between the inverter 220 and the motor 250 and may use a current transformer (CT), a shunt resistor, and so on for current detection.

Figure 12:
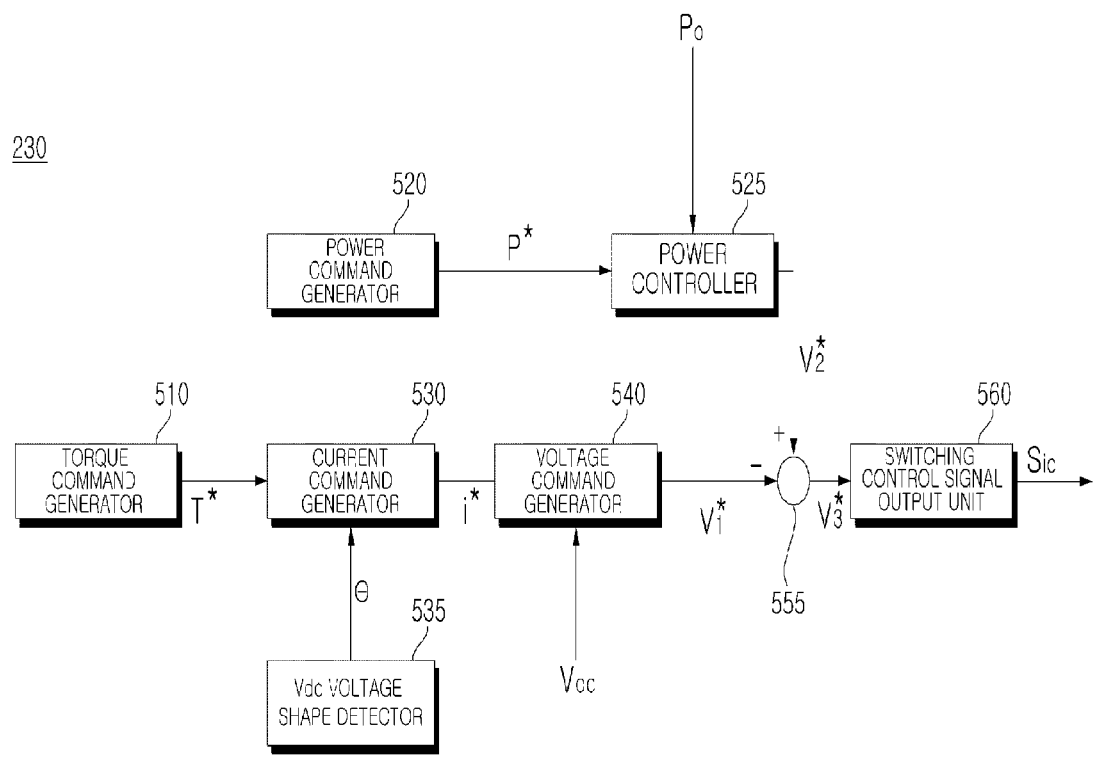
FIG. 12 is an example of an internal block diagram of an inverter controller of FIG. 3.

The inverter controller 230 may include a torque command generator 510 (refer to FIG. 12), a current command generator 530 (refer to FIG. 12), a voltage command generator 540 (refer to FIG. 12), and a switching control signal output unit 560 (refer to FIG. 12). In addition, the inverter controller 230 may further include a power command generator 520 (refer to FIG. 12), a power controller 525 (refer to FIG. 12), and a Vdc voltage shape detector 535 (refer to FIG. 12), which will be described below in more detail with reference to FIGS. 1 to 8.

The outputted inverter switching control signal Sic may be converted into a gate driving signal by a gate driver (not shown) and inputted to a gate of each switching device in the inverter 220. Thus, switching devices Sa, S'a, Sb, S'b, Sc, and S'c in the inverter 220 perform respective switching operations.

According to another embodiment of the present invention, the converter controller 215 controls the boost converter 420 to reduce a peak value of a ripple voltage using a higher harmonic corresponding to a phase of the input voltage Vs, thereby reducing a maximum voltage of a DC terminal in the compressor motor driving device 200 using the boost converter 420 and the low-capacitance capacitor C. Accordingly, durability with respect to a circuit device in the compressor motor driving device 200 is enhanced. In addition, a maximum value of phase current flowing in the motor may be reduced to reduce iron loss and copper loss of the motor 250, thereby enhancing motor driving efficiency, which will be described in more detail with reference to FIGS. 1 to 7.

According to another embodiment of the present invention, in order to stably drive the motor 250 as a load, in particular to expand a scope of a driving area based on a ripple voltage Vdc, the inverter controller 230 of the compressor motor driving device 200 controls the inverter 220 based on an instantaneous power command value of inverter power Pinv.

In particular, when the inverter power Pinv for driving the motor 250 is reference power or less, a current mode is a first mode and the inverter controller 230 may control the inverter 220 based on an average power command value of the inverter power Pinv, and when the inverter power Pinv for driving the motor 250 is the reference power or more, the inverter controller 230 may control the inverter 220 based on an instantaneous power command value of the inverter power Pinv. Thus, stable driving is possible with respect to a load in the compressor motor driving device 200 using the boost converter 420 and the low-capacitance capacitor C, which will be described in more detail with reference to FIG. 12.

FIGS. 5A to 6B are diagrams for explanation of the motor driving device 200 of FIG. 4.

Figure 5A:
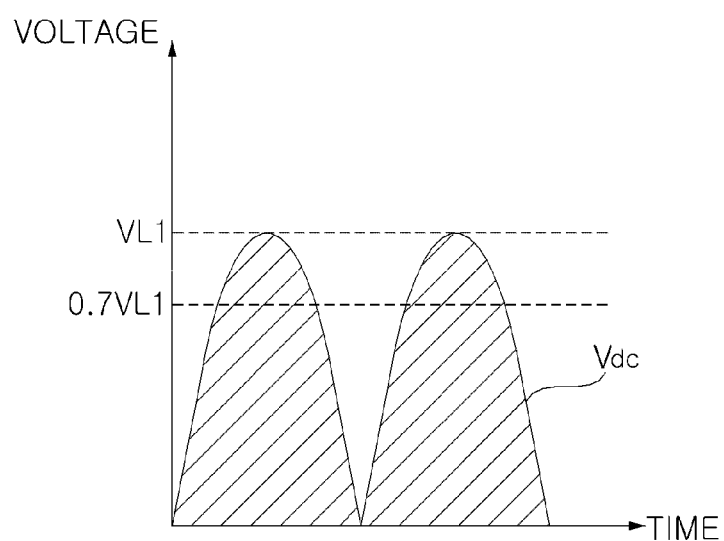
FIG. 5A illustrates a DC terminal voltage Vdc when a low-capacitance DC terminal capacitor C is connected to a rectifier without a boost converter of FIG. 4.

FIG. 5A illustrates the DC terminal voltage Vdc when the low-capacitance DC terminal capacitor C is connected to the rectifier 410 without the boost converter 420 of FIG. 4.

When the low-capacitance DC terminal capacitor C is used, the low-capacitance DC terminal capacitor Cb does not smooth the DC terminal voltage Vdc, and thus the ripple DC terminal voltage Vdc is supplied to the inverter 220 without much change, as illustrated in FIG. 5A.

In this case, an average voltage of about 0.7 VL1 that is lower than a peak value VL1 of the ripple DC terminal voltage Vdc is formed.

The inverter 220 may generate three-phase AC power using a voltage of about 0.7 VL1. However, it may be difficult to smoothly drive a motor in a voltage period of about 0.7 VL1 or less. Thus, a voltage utilization ratio may be lowered.

As illustrated in FIG. 5A, when a frequency of an input voltage is about 60 Hz, ripple voltage of about 120 Hz corresponding to twice the frequency of the input voltage is generated.

Figure 5B:
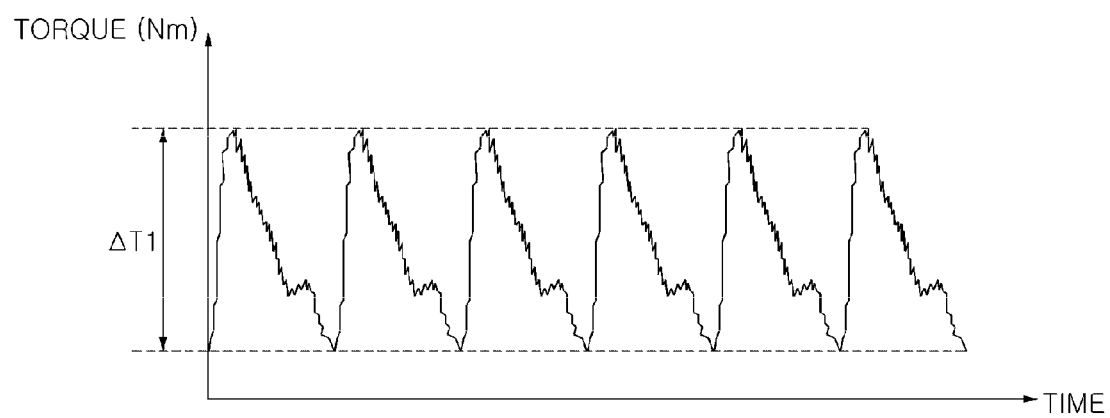
FIG. 5B illustrates a torque ripple when a motor is driven through an inverter using a ripple voltage shown in FIG. 5A.

When the motor 250 is driven through the inverter 220 using the ripple voltage shown in FIG. 5A, torque ripple corresponding to ΔT1 is generated, as illustrated in FIG. 5B. Due to the torque ripple, vibration and noise are generated in the motor 250.

As capacitance of the low-capacitance DC terminal capacitor C is reduced, current control, etc., are not efficiently performed, thereby achieving low input power factor characteristics.

To overcome this problem, according to the embodiment of the present invention, as illustrated in FIG. 4, the boost converter 420 is disposed after the rectifier 410.

Figure 6A:
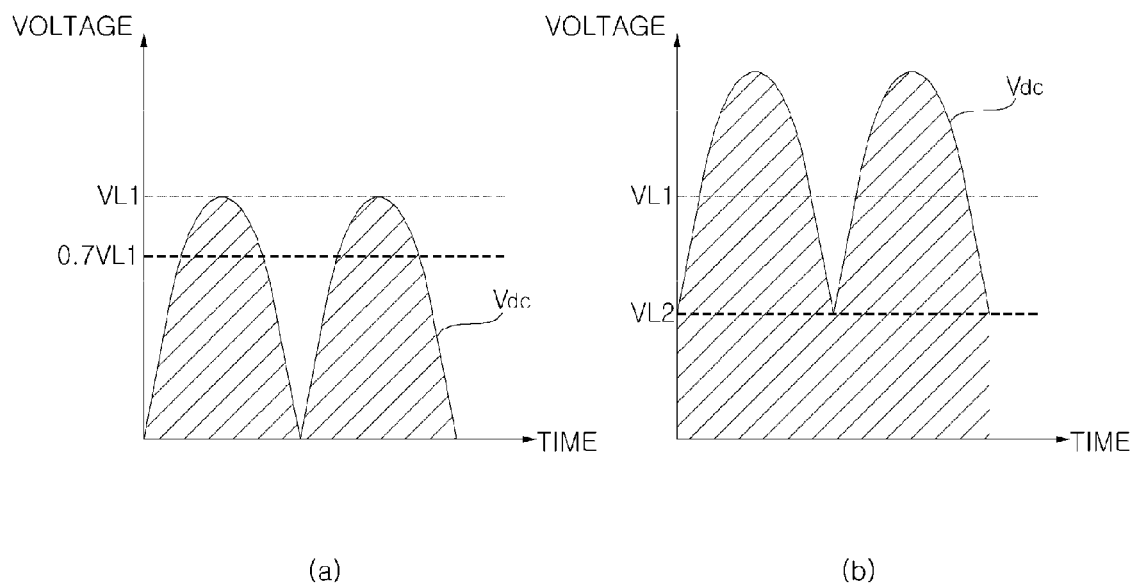
FIG. 6A illustrates the DC terminal voltage Vdc when the boost converter and the low-capacitance DC terminal capacitor C of FIG. 4 are used.

FIG. 6A illustrates the DC terminal voltage Vdc when the boost converter 420 and the low-capacitance DC terminal capacitor C of FIG. 4 are used.

When a voltage is boosted by as much as a voltage VL2 using the boost converter 420, a ripple voltage with a minimum voltage of VL2 and a peak value of VL2+VL1 is outputted to a DC terminal. Accordingly, an average voltage of about VL1 may be formed.

The inverter 220 may generate three-phase AC power using a voltage of about VL1 but may smoothly drive a motor in most voltage periods. Accordingly, a voltage utilization ratio may be enhanced and a driving area is increased.

Figure 6B:
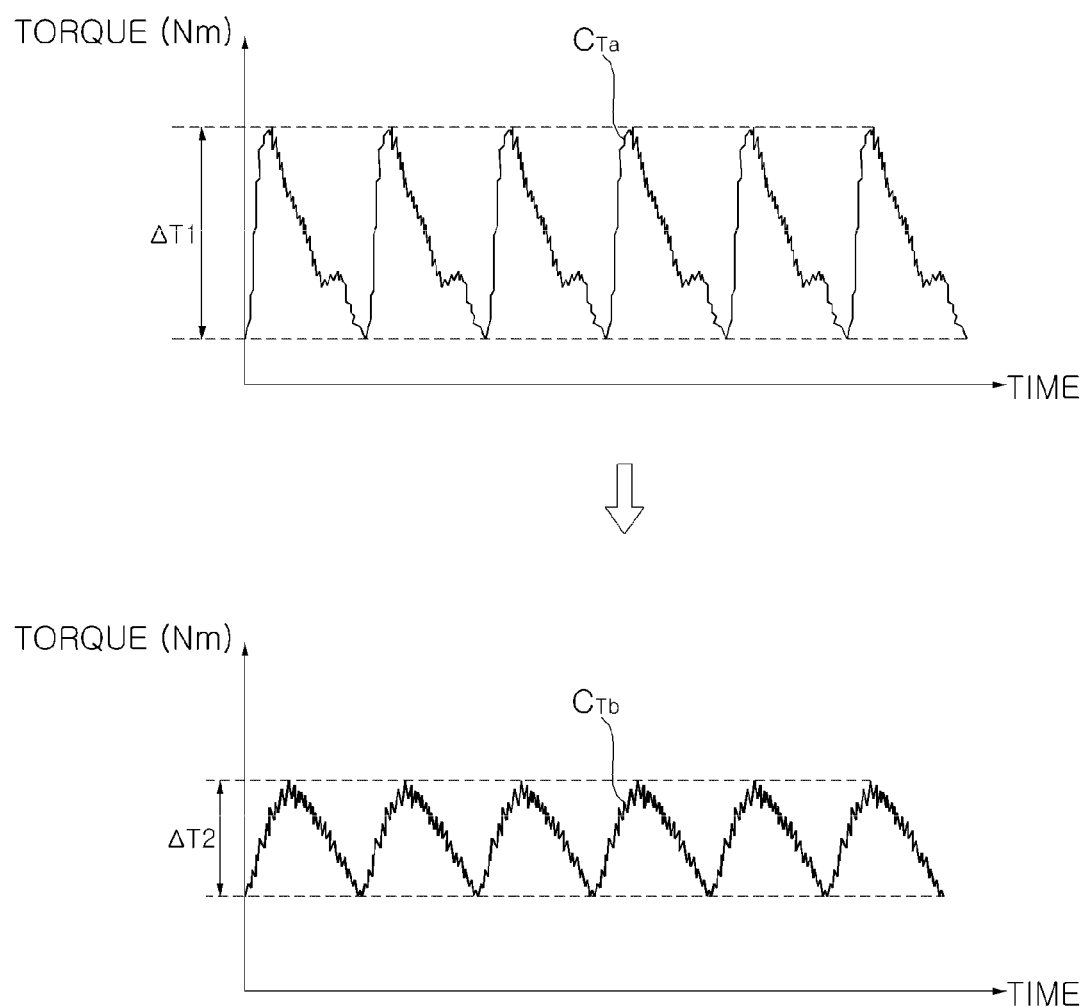
FIG. 6B illustrates the torque ripple when the motor is driven through the inverter using the ripple voltage shown in FIG. 6A.

When the motor 250 is driven through the inverter 220, torque ripple corresponding to ΔT2 is generated, as illustrated in FIG. 6B, by the DC terminal voltage Vdc when the boost converter 420 and the low-capacitance DC terminal capacitor C are used, as illustrated in FIG. 4. That is, torque ripple corresponding to ΔT2 less than ΔT1 of FIG. 5B may be generated. That is, torque ripple is significantly lowered.

When the boost converter 420 is used, the input current Is is more efficiently controlled, thereby enhancing input power factor.

When a home appliance is driven using single-phase AC power, a circuit device with an internal tolerance of 600 V is used in general. In this case, when a low-capacitance capacitor is used as a DC terminal capacitor, a maximum voltage of a DC terminal is increased due to load increase, and thus there is a possibility that various devices in the motor driving device can be damaged. In particular, the inverter 220 which may have limited internal tolerance of about 450 V, may have the highest damage.

In order to reduce the damage possibility, when a target control voltage is lowered, an output voltage of the inverter 220 may be reduced due to reduction in an average voltage or a root mean square (RMS) voltage, thereby limiting a driving area of a motor or reducing driving efficiency of the motor.

According to the embodiment of the present invention, a peak value of a ripple voltage, that is, a DC terminal voltage may be lowered using a higher harmonic corresponding to a phase of an input voltage in a motor driving device using a boost converter and a low-capacitance capacitor. This could prevent a circuit device from being damaged and prevent driving efficiency of a motor from being degraded. Thus, durability with respect to a circuit device in a motor driving device may be enhanced. In addition, a maximum value of phase current flowing in the motor may be reduced to reduce iron loss and copper loss of the motor, thereby enhancing motor driving efficiency. In addition, a voltage utilization ratio of a voltage input to an inverter in a motor driving device using a low-capacitance capacitor may be enhanced.

The higher harmonics injection scheme will be described with reference to FIGS. 1 to 7.

Figure 7:
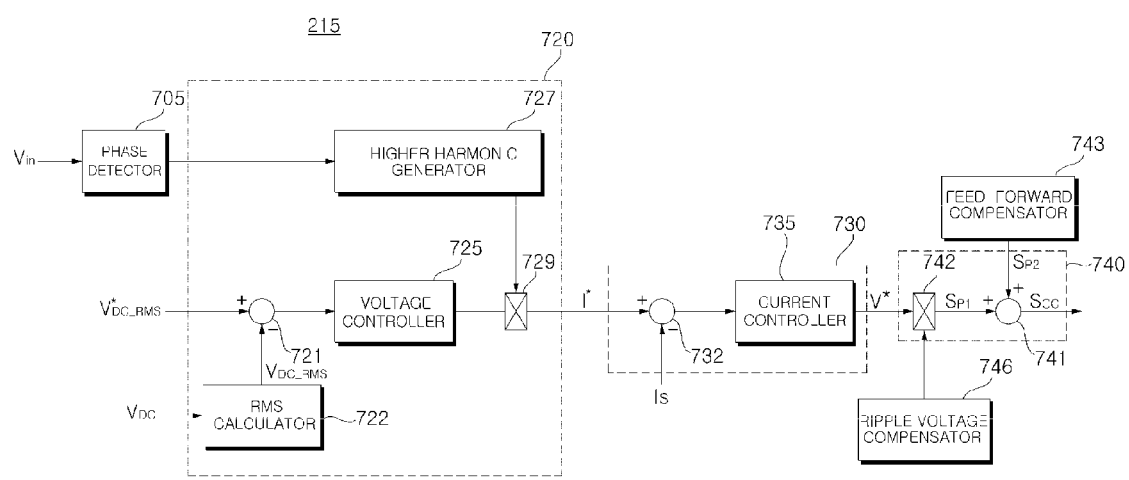
FIG. 7 is an example of an internal block diagram of a converter controller of FIG. 3.
Figure 8:
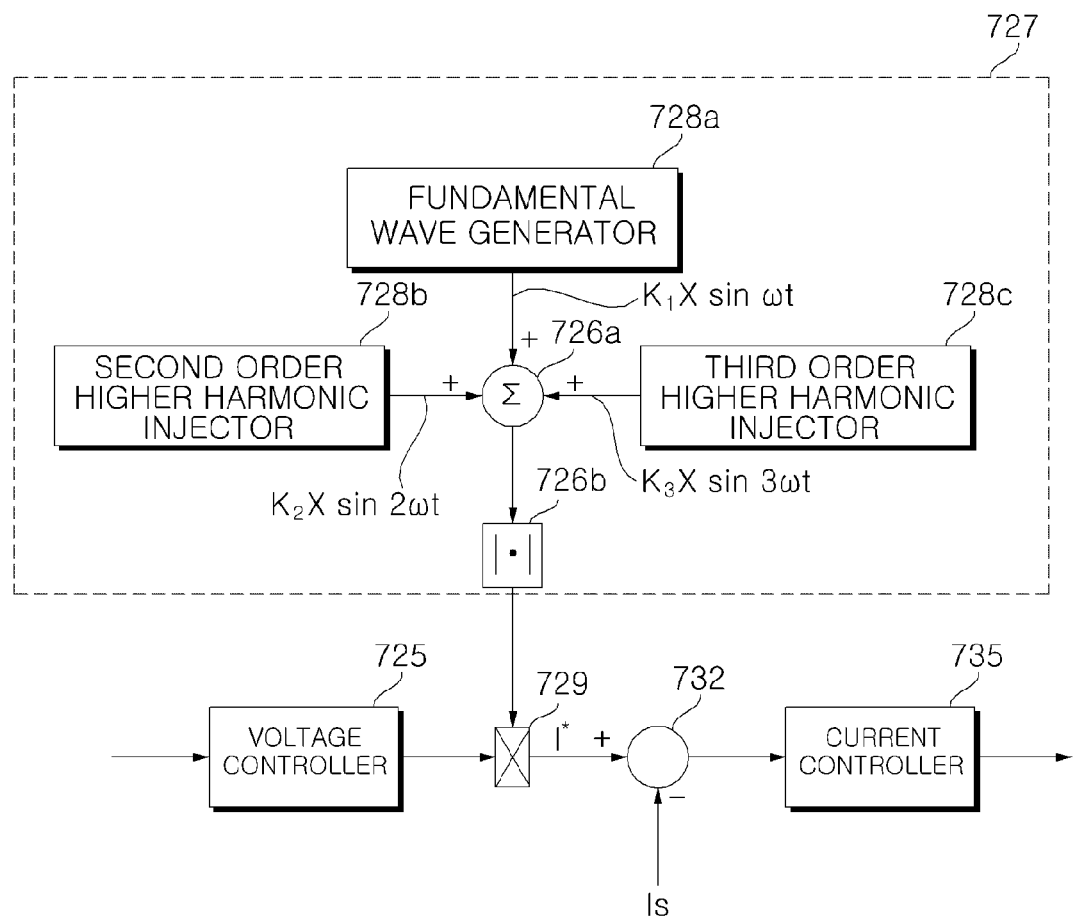
FIG. 8 is an example of an internal block diagram of a higher harmonic generator of FIG. 7.

FIG. 7 is an example of an internal block diagram of the converter controller 215 of FIG. 3. FIG. 8 is an example of an internal block diagram of a higher harmonic generator 727 of FIG. 7. FIGS. 9 to 11 are diagrams for explanation of an operation of the converter controller 215 of FIG. 3.

Referring to FIG. 7, the converter controller 215 may include the current command generator 720 for generating a higher harmonic corresponding to a phase of the input voltage Vs and the ripple voltage Vdc and generating a current command value I* using the generated higher harmonic, the voltage command generator 730 for generating a voltage command value V* based on the input current Is corresponding to input AC power and a current command value, and a switching control signal output unit 740 for outputting the converter switching control signal Scc based on the voltage command value.

The converter controller 215 may further include a feedforward compensator 743 for generating a second switching control signal for conversion compensation and a ripple voltage compensator 746 for compensating for a ripple voltage to output a ripple voltage compensation value.

The converter controller 215 may generate a second order higher harmonic and a third order higher harmonic compared with a fundamental wave of the input voltage Vs.

The converter controller 215 may generate a second order higher harmonic and a third order higher harmonic so as to achieve "1" as the sum of coefficients of the fundamental wave, the second order higher harmonic, and the third order higher harmonic.

The converter controller 215 may generate a second order higher harmonic and a third order higher harmonic so as to increase coefficients of the second order higher harmonic, and the third order higher harmonic as a peak value of the ripple voltage is reduced.

The current command generator 720 in the converter controller 215 may generate an input current command value I*s based on the input voltage Vs and the DC terminal voltage Vdc.

To this end, the current command generator 720 may include the voltage controller 725 for voltage control based on a ripple voltage, the higher harmonic generator 727 for generating a higher harmonic corresponding to a phase of an input voltage, and a root mean square (RMS) calculator 722 for calculating RMS of the ripple voltage, that is, the DC terminal voltage.

The RMS calculator 722 calculates the RMS of the ripple DC terminal voltage detected from the DC voltage detector B. In this case, a frequency of the RMS may be twice a frequency of the input voltage Vs.

A subtractor 721 outputs a difference between an RMS command value V*dc_RMS and the calculated RMS Vdc_RMS to the voltage controller 725.

The voltage controller 725 performs voltage control based on the difference between the RMS command value V*dc_RMS and the calculated RMS Vdc_RMS to generate a first current command value.

The higher harmonic generator 727 may receive phase information from a phase detector 705 for detecting a phase of the input voltage Vs. In addition, the higher harmonic generator 727 may generate a second current command value I*r including a higher harmonic represented according to Expression 1 below.

$$I^*_r(t) = |K_1 \sin(\omega t) + K_2 \sin(2\omega t) + K_3 \sin(3\omega t)| \quad \text{[Expression 1]}$$

Here, K1 is a coefficient of a fundamental wave with a frequency of w, K2 is a coefficient of a second order higher harmonic with a frequency of 2w, and K3 is a coefficient of a third order higher harmonic with a frequency of 3w.

FIG. 8 illustrates a detailed block diagram of the higher harmonic generator 727.

That is, the higher harmonic generator 727 may include a fundamental wave generator 728a for generating a fundamental wave K1 sin ωt using a coefficient K1, a second order higher harmonic injector 728b for generating a second order higher harmonic K2 sin 2ωt using a coefficient K2, a third order higher harmonic injector 728c for generating a third order higher harmonic K3 sin 3ωt using a coefficient K3, an adder 726a for summing the fundamental wave, the second order higher harmonic, and the third order higher harmonic, and a size output unit 726b for outputting sizes of the fundamental wave, the second order higher harmonic, and the third order higher harmonic.

The sum of K1, K2, and K3 may be 1.

A calculator 729 may generate and output a final current command value I* using a first current command value from the voltage controller 725 and a second current command value from the higher harmonic generator 727.

The calculator 729 may be a multiplier and may multiply a first current command value corresponding to a magnitude of a current command value from the voltage controller 725 and a second current command value corresponding to a sine wave. In addition, the calculator 729 may output a final current command value I* as the multiplied value.

Figure 9A:
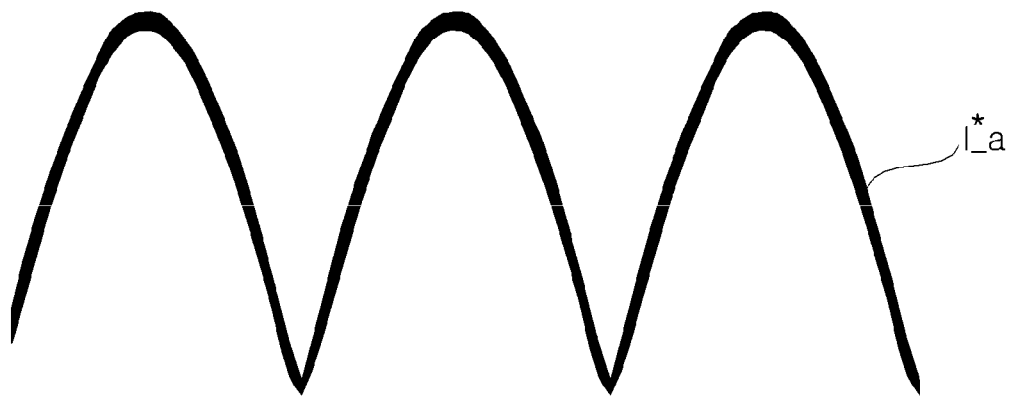
FIG. 9A illustrates a current command value I*_a output from a current command generator of FIG. 7 when K1 is 1 and K2 and K3 are 0.

FIG. 9A illustrates a current command value I*_a outputted from the current command generator 720 when K1 is 1 and K2 and K3 are 0. As illustrated in FIG. 9A, when the ripple current command value I*_a similar to the DC terminal voltage is outputted, high voltage ripple is generated in the DC terminal voltage.

Figure 9B:
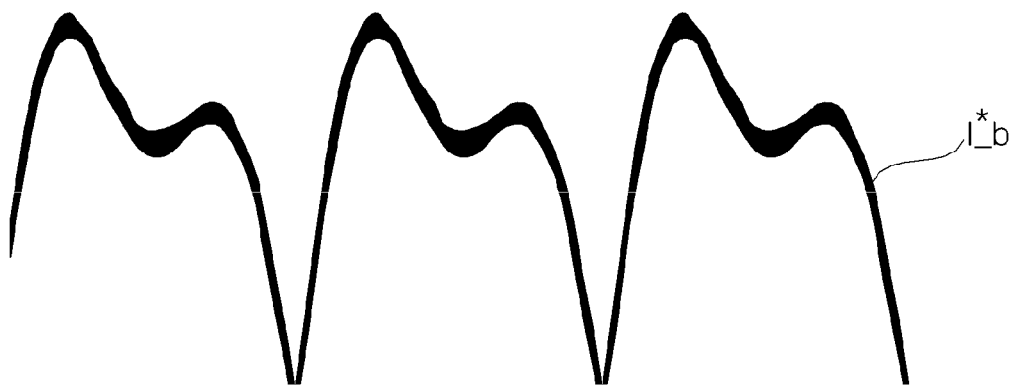
FIG. 9B illustrates a current command value I*_b output from the current command generator of FIG. 7 when K1 is set to be less than 1 and K2 and K3 are each set to be a predetermined value.

FIG. 9B illustrates a current command value I*_b outputted from the current command generator 720 when K1 is set to be less than 1 and K2 and K3 are each set to be a predetermined value.

As illustrated in FIG. 9B, when the current command value is outputted in consideration of a second order higher harmonic and third order higher harmonic, a maximum of the current command value is lowered. Compared with FIG. 9A, a right portion of a convex portion is lowered. Thus, a maximum value of the DC terminal voltage may be lowered.

FIG. 11 illustrates various examples of a ratio of K1, K2, and K3 determined by the higher harmonic generator 727.

FIG. 11 is a table 1100 of the ratio of K1, K2, and K3 determined by the higher harmonic generator 727, which may be stored in the higher harmonic generator 727.

Referring to FIG. 11, as an input ratio of a fundamental wave is reduced and a ratio of a third order higher harmonic is increased, a peak value of Vdc is lowered. In addition, as a third order higher harmonic is increased and a ratio of a second order higher harmonic is increased, the peak value of Vdc is further lowered.

In this case, when an injection ratio of a higher harmonic is increased, K2 may be a ratio of 0.02 to 0.04 in order to compensate for distortion of sinusoidal characteristics of the DC terminal voltage Vdc.

In the end, the higher harmonic generator 727 may generate a second order higher harmonic and a third order higher harmonic so as to increase coefficients K2 and K3 of the second order higher harmonic and the third order higher harmonic in order to lower a peak value of the ripple voltage Vdc.

A ratio of K1, K2, and K3 may be set in consideration of a power factor. For example, the ratio may be set with a power factor of 98% or more.

Then, the voltage command generator 730 may generate a voltage command value based on the difference between the input current Is and the current command value I* from the current command generator 720.

To this end, the voltage command generator 730 may include a subtracter 732 for calculation of a difference between the current command value I* and the input current Is from the current command generator 720 and a current controller 735 for generating the voltage command value V* based on the difference between the current command value I* and the input current Is.

The switching control signal output unit 740 outputs a converter switching control signal Vcc based on the voltage command value V* from the voltage command generator 730.

The ripple voltage compensator 746 may compensate for a ripple voltage to output a ripple voltage compensation value. Thus, the switching control signal output unit 740 may calculate the voltage command value V* from the voltage command generator 730 and the ripple voltage compensation value from the ripple voltage compensator 746 using a calculator 742 and generate a first switching control signal Sp1 corresponding to a first duty using the calculated value.

In this case, the calculator 742 may be a multiplier and may multiply the voltage command value V* from the voltage command generator 730 and the ripple voltage compensation value from the ripple voltage compensator 746. In addition, the calculator 742 may generate the first switching control signal Sp1 corresponding to a first duty that is the multiplied value.

A feed-forward compensator 743 performs feed-forward compensation in order to remove disturbance composed of the DC terminal voltage Vdc and the input voltage Vs of the boost converter 420. Thus, the feed-forward compensator 743 may generate a second switching control signal Sp2 corresponding to a second duty obtained by considering disturbance removal.

An adder 741 may add the first switching control signal Sp1 and the second switching control signal Sp2 to output the converter switching control signal Scc. That is, the adder 741 may output the converter switching control signal Scc obtained by considering the first duty and the second duty.

As described above, the switching device S1 in the boost converter 420 may operate based on the converter switching control signal Scc, thereby reducing a maximum value of the ripple DC terminal voltage.

Figure 10A:
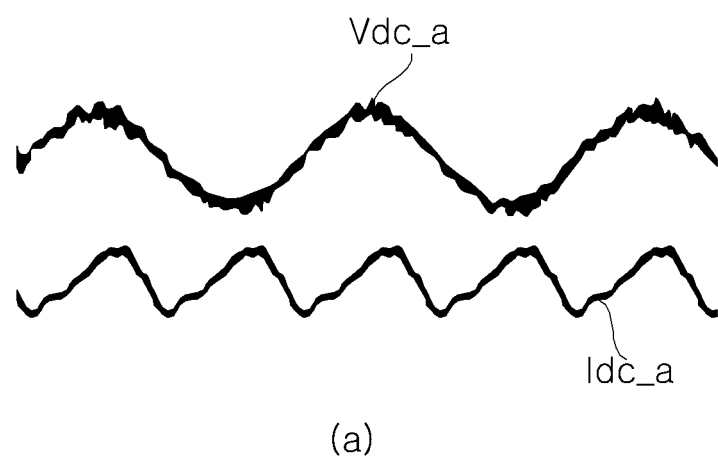
FIG. 10A illustrates a DC terminal voltage shape Vdc_a and a DC terminal current shape Idc_a when the boost converter operates based on a converter switching control signal before and after a higher harmonic is injected.
Figure 10A:
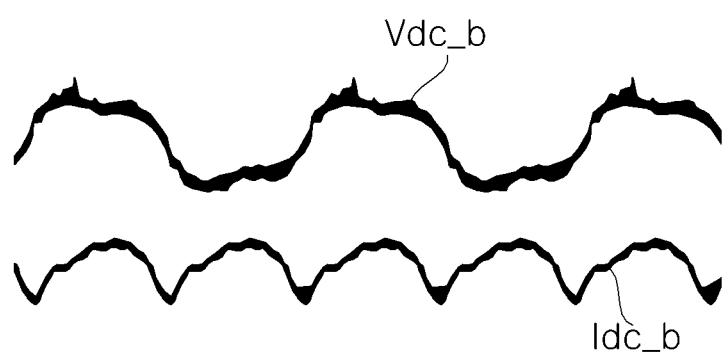

FIG. 10A(A) illustrates a DC terminal voltage shape Vdc_a and a DC terminal current shape Idc_a when the boost converter 420 operates based on a converter switching control signal before a higher harmonic is injected.

FIG. 10A(B) illustrates a DC terminal voltage shape Vdc_b and a DC terminal current shape Idc_b when the boost converter 420 operates based on a converter switching control signal after a higher harmonic is injected.

Comparing FIG. 10A(A) and FIG. 10A(B), it may be seen that a maximum value of the DC terminal voltage shape Vdc_b of FIG. 10A(B) is further reduced, and a maximum value of the DC terminal current shape Idc_b is further reduced. Accordingly, loss possibility of a circuit device in the motor driving device 200 is reduced.

FIG. 10B(A) illustrates a phase current shape Ia_a flowing to the motor 250 before a higher harmonic is injected. FIG. 10B(B) illustrates a phase current shape Ia_b flowing to the motor 250 after a higher harmonic is injected.

Comparing FIG. 10B(A) and FIG. 10B(B), it may be seen that a maximum of the phase current shape Ia_b of FIG. 10B(B) is further reduced and a maximum value of the DC terminal current shape Idc_b is further reduced. That is, ripple is further reduced. Thus, loss possibility of a circuit device in the motor driving device 200 is reduced. In the end, iron loss and copper loss of the motor 250 may be reduced to enhance motor driving efficiency.

FIG. 12 is an example of an internal block diagram of the inverter controller 230 of FIG. 3. FIGS. 13 to 16 are diagrams for explanation of an operation of the inverter controller 230 of FIG. 12.

First, referring to FIG. 12, the inverter controller 230 may include the torque command generator 510, the current command generator 530, the voltage command generator 540, and the switching control signal output unit 560. In addition, the inverter controller 230 may further include the power command generator 520, the power controller 525, and the Vdc voltage shape detector 535.

The inverter controller 230 may determine a first mode or a second mode according to whether the inverter power Pinv is reference power or more.

For example, when the inverter power Pinv is less than reference power Pinv_min, the inverter controller 230 may control the inverter 220 based on an average power command value Pavg of inverter power, and when the inverter power Pinv is the reference power Pinv_min or more, the inverter controller 230 may control the inverter 220 based on an instantaneous power command value Pinv_ref of the inverter power. Here, the inverter power Pinv may correspond to the average power command value Pavg.

That is, when target power with respect to load is low, and thus required inverter power is low, the inverter controller 230 controls the inverter 220 based on the average power command value Pavg irrespective of the ripple voltage Vdc, and when target power with respect to load is high, and thus required inverter power is high, the inverter controller 230 controls the inverter 220 based on the instantaneous power command value Pinv_ref of the inverter power in consideration of the ripple voltage Vdc. Accordingly, it may be possible to stably drive the motor under the capacitorless motor driving device.

The reference power Pinv_min may be increased as capacitance of the capacitor C is increased.

The reference power Pinv_min may be increased in proportion to a limit of ripple ΔVdc of a ripple voltage.

Figure 13:
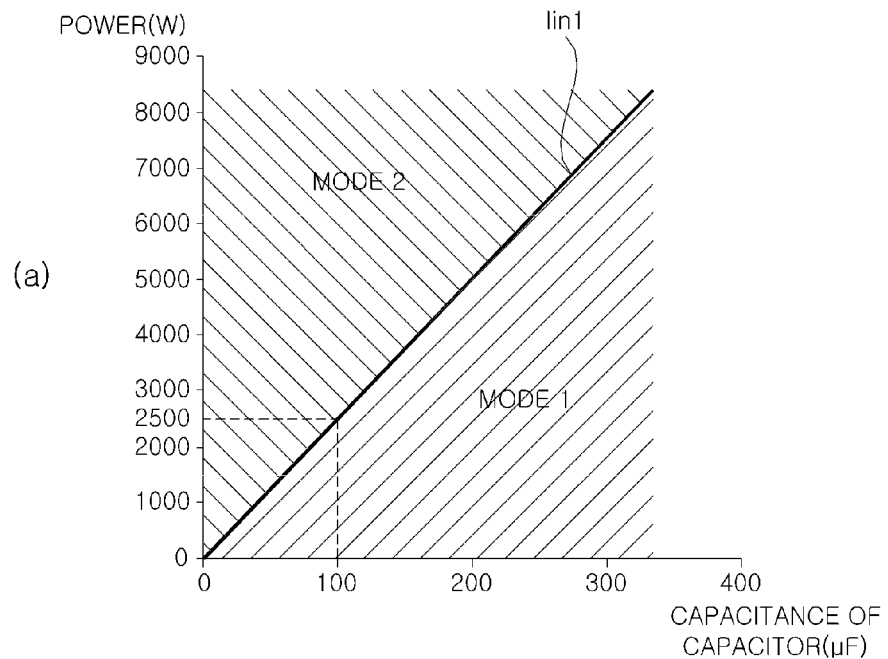
FIG. 13 illustrates a relationship of reference power of inverter power with respect to capacitance of the capacitor.
Figure 13:
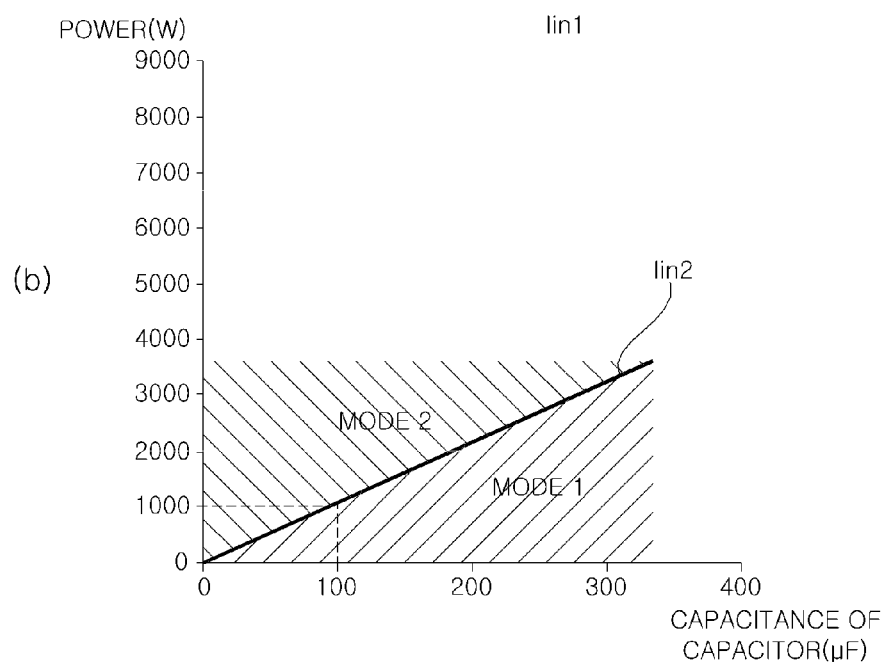

FIG. 13 illustrates a relationship of reference power of inverter power with respect to capacitance of a capacitor. The horizontal axis may be capacitance of a capacitor and the vertical axis may be inverter power Pinv or an average power command value Pavg of inverter power.

As seen from FIG. 13(A), a first line Lin1 is reference power Pinv_min of inverter power, and as capacitance of a capacitor, that is, capacitance is increased, the reference power Pinv_min of the inverter power is increased.

In this case, when the average power command value Pavg of the inverter or the inverter power Pinv is less than the reference power Pinv_min, the inverter controller 230 may control the inverter 220 to operate in a first mode, and when the average power command value Pavg of the inverter power or the inverter power Pinv is the reference power Pinv_min or more, the inverter controller 230 may control the inverter 220 to operate in a second mode.

For example, when capacitance of a capacitor is 100 uF, if the average power command value Pavg of the inverter power or the inverter power Pinv is less than 2500 W, the reference power Pinv_min, the inverter 220 may operate in the first mode, and if the average power command value Pavg of the inverter power or the inverter power Pinv is 2500 W or more, the inverter 220 may operate in the second mode.

FIG. 13(A) illustrates the case in which a limit of ripple ΔVdc of a ripple voltage is about 300 V. FIG. 13(B) illustrates the case in which a limit of ripple ΔVdc of a ripple voltage is about 100 V.

As seen from FIG. 13(B), an inclination of a second line Lin2 indicating the reference power Pinv_min is less than an inclination of the first line Lin1 of FIG. 13(A).

That is, as a limit of ripple ΔVdc of a ripple voltage is reduced, the reference power Pinv_min may be reduced, and as a limit of ripple ΔVdc of a ripple voltage is increased, the reference power Pinv_min may be increased.

For example, in FIG. 13(B), when a 100 uF capacitor is used, if the average power command value Pavg of inverter power or the inverter power Pinv is less than 1000 W that is the reference power Pinv_min, the inverter 220 may operate in the first mode, and when the average power command value Pavg of inverter power or the inverter power Pinv is 1000 W or more, the inverter 220 may operate in the second mode.

Figure 14:
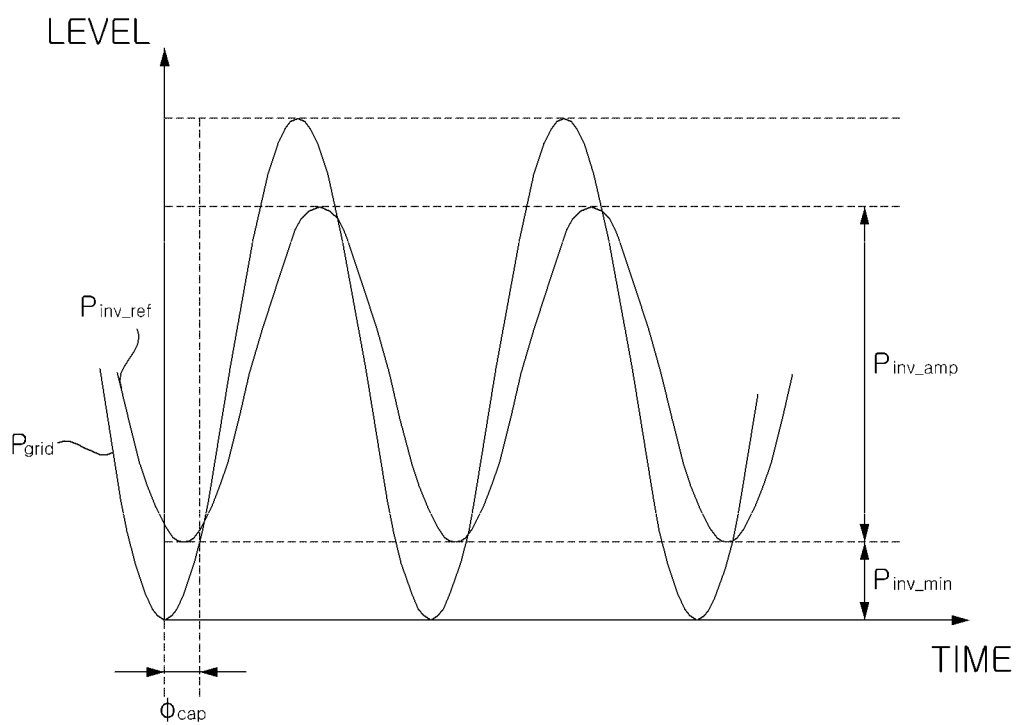
FIG. 14 is a diagram for explanation of a method for calculating an instantaneous power command value in a second mode.

FIG. 14 is a diagram for explanation of a method for calculating an instantaneous power command value in a second mode.

First, the inverter controller 230 may calculate the average power command value Pavg of the inverter power based on torque applied to the motor 250 or a torque command value $T^*_e$ and rotational speed corm of the motor 250 according to Expression 2 below.

$$P_{avg} = \overline{T}^*_e \times \omega_{rm} \quad \text{[Expression 2]}$$

In addition, the inverter controller 230 may calculate the reference power Pinv_min based on a limit of ripple ΔVdc of a ripple voltage, capacitance of a capacitor C, and the average power command value Pavg of required inverter power.

In addition, when the average power command value Pavg of the required inverter power is the reference power Pinv_min or more, the inverter controller 230 may calculate an instantaneous power command value Pinv_ref in the second mode.

First, the inverter controller 230 may calculate an instantaneous power command value size Pinv_amp based on the average power command value Pavg and the reference power Pinv_min. That is, according to Expression 3 below, the inverter controller 230 may calculate the instantaneous power command value size Pinv_amp by doubling a value obtained by subtracting the reference power Pinv_min from the average power command value Pavg.

$$P_{inv\_amp} = 2(P_{avg} - P_{inv\_min}) \quad \text{[Expression 3]}$$

The inverter controller 230 may calculate or detect a phase φcap of an instantaneous power command value compared with a ripple voltage Vdc or input power Pgrid based on input AC power.

In addition, the inverter controller 230 may calculate the instantaneous power command value Pinv_ref of inverter power using the calculated instantaneous power command value size Pinv_amp and the calculated or detected phase φcap of the instantaneous power command value according to Expression 4 below.

$$P_{inv\_ref} = P_{inv\_min} + P_{inv\_amp}(\sin^2 \Omega t + \phi_{cap}) \quad \text{[Expression 4]}$$

The phase φcap of the instantaneous power command value may track the input power Pgrid based on input AC power or the ripple voltage Vdc for driving efficiency.

As a size of the average power command value Pavg of inverter power or the inverter power Pinv is increased, error due to the phase φcap of the instantaneous power command value is increased. Accordingly, as the size of the average power command value Pavg of inverter power or the inverter power Pinv is increased, the phase φcap of the instantaneous power command value needs to be reduced.

Figure 15:
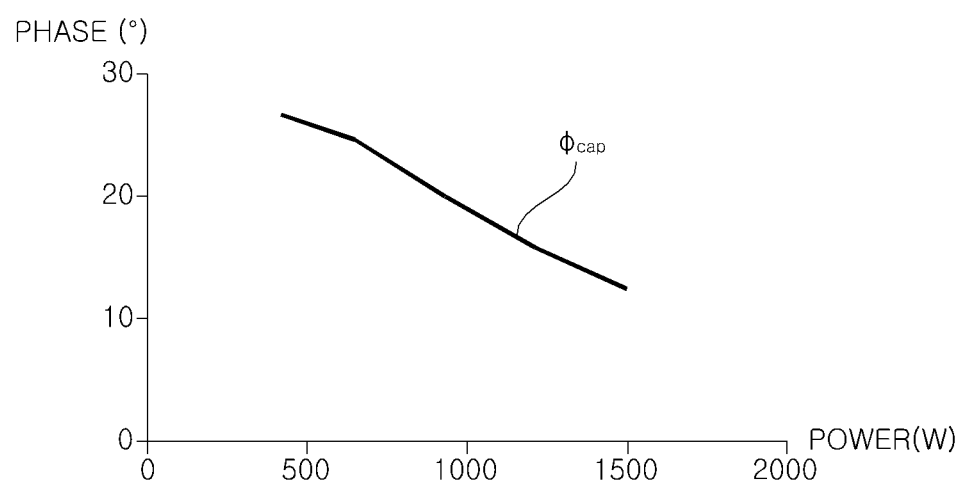
FIG. 15 illustrates the case in which the phase φcap of the instantaneous power command value is reduced as the size of the average power command value Pavg of inverter power or the inverter power Pinv is increased.

FIG. 15 illustrates the case in which the phase φcap of the instantaneous power command value is reduced as the size of the average power command value Pavg of inverter power or the inverter power Pinv is increased.

In FIG. 15, the horizontal axis may be the average power command value Pavg of inverter or the inverter power Pinv, the vertical axis may be a phase, and a straight line may be the phase φcap of the instantaneous power command value.

Figure 16A:
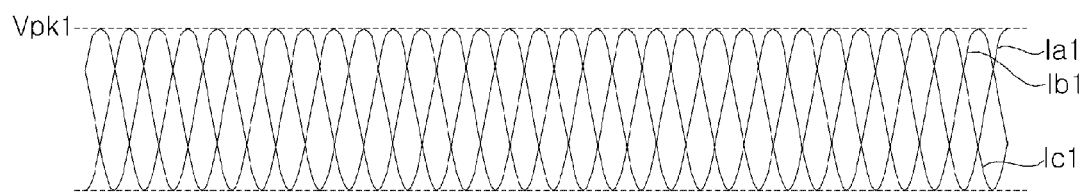
FIG. 16A illustrates shapes of the phase currents Ia1, Ib1, and Ic1 with a constant peak value Vpk1 when an inverter is controlled based on an average power command value Pavg of the inverter power in the first mode.
Figure 16B:
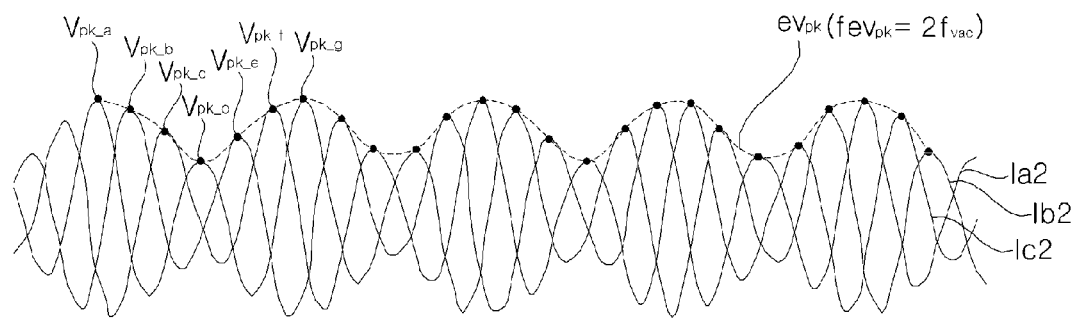
FIG. 16B illustrates shapes in which peak values Vpk_a, Vpk_b, Vpk_c, Vpk_d, Vpk_e, and Vpk_f of the three-phase currents Ia2, Ib2, and Ic2 ripple to form a ripple envelope evpk for the peak values of the three-phase current when the inverter is controlled based on the instantaneous power command value the inverter in the second mode.

When the instantaneous power command value of inverter power is calculated to track the ripple voltage Vdc and the inverter 220 is controlled based on the instantaneous power command value Pinv_ref of the inverter power in the second mode, shapes of phase currents Ia2, Ib2, and Ic2 flow in the motor 250 as illustrated in FIG. 16B.

That is, a frequency of the ripple voltage Vdc is twice a frequency Vs or Vac of input power, and thus when an inverter is controlled based on the instantaneous power command value of inverter power in the second mode, peak values Vpk_a, Vpk_b, Vpk_c, Vpk_d, Vpk_e, and Vpk_f of the three-phase currents Ia2, Ib2, and Ic2 are not constant, unlike in FIG. 16A.

That is, peak values of the three-phase currents Ia2, Ib2, and Ic2 may ripple to track the ripple voltage Vdc, as illustrated in FIG. 16B.

FIG. 16B illustrates the case in which peak values Vpk_a, Vpk_b, Vpk_c, Vpk_d, Vpk_e, and Vpk_f of the three-phase currents Ia2, Ib2, and Ic2 ripple to form a ripple envelope evpk for the peak values of the three-phase current.

The ripple envelope evpk for the peak values of the three-phase current is formed with periodically repeated portions and formed in such a way that a frequency fevpk of the ripple envelope evpk for the peak values of the three-phase current is twice a frequency fvac of input power.

That is, the frequency fevpk of the ripple envelope evpk for the peak values of the three-phase current is the same as a frequency of the ripple voltage Vdc. For example, when a frequency of an input voltage is about 60 Hz, the frequency of the ripple voltage Vdc and the ripple frequency fevpk of the peak values of the three-phase current may be about 120 Hz that is twice the frequency of the input voltage.

In the end, when the inverter is controlled based on the instantaneous power command value of the inverter in the second mode, the ripple frequency fevpk of the peak values Vpk_a, Vpk_b, Vpk_c, Vpk_d, Vpk_e, and Vpk_f of the three-phase currents Ia2, Ib2, and Ic2 is twice the frequency fvac of the input AC power. From the shapes of the three-phase currents Ia2, Ib2, and Ic2, second mode driving may be seen.

When the inverter 220 is controlled based on the average power command value Pavg of inverter power in the first mode, the ripple voltage Vdc is not tracked and an average voltage of a ripple voltage is tracked, and thus the shapes of the phase currents Ia1, Ib1, and Ic1 with a constant peak value Vpk1 may flow to the motor 250, as illustrated in FIG. 16A.

From the shapes of the phase currents Ia1, Ib1, and Ic1, first mode driving may be seen.

The first mode operation and the second mode operation will be described in more detail with reference to the internal block diagram of FIG. 8.

In the case of first mode, the torque command generator 510, the current command generator 530, the voltage command generator 540, and the switching control signal output unit 560 in the inverter controller 230 may operate. In the case of second mode, the power command generator 520, the power controller 525, and the Vdc voltage shape detector 535 as well as the torque command generator 510, the current command generator 530, the voltage command generator 540, and the switching control signal output unit 560 in the inverter controller 230 may operate.

In the case of first mode, the torque command generator 510 may output a torque command value T* for rotation of an electric motor based on a velocity command value ω*r corresponding to power required for a load. In particular, the torque command generator 510 may output the average torque command value T* based on the average velocity command value ω*r corresponding to the average power command value Pavg of inverter power.

The current command generator 530 may generate a current command value I* based on the torque command value T*. Here, the current command value I* is the concept of including a d-axis current command value and a q-axis current command value of a fitted coordinate system.

The voltage command generator 540 may generate a first voltage command value V*1 based on the current command value I*. Here, the first voltage command value V*1 is the concept of including a d-axis voltage command value and a q-axis voltage command value of a fitted coordinate system.

The switching control signal output unit 560 may generate and output the switching control signal Sic based on the first voltage command value V*1.

In the end, in the first mode, the inverter controller 230 may generate and output the switching control signal Sic based on the average power command value Pavg of inverter power to control the inverter 220.

Then, in the second mode, an operation of the torque command generator 510 may be the same as that of the first mode.

The Vdc voltage shape detector 535 may detect a shape of the ripple voltage Vdc and output a phase θ of the ripple voltage Vdc to the current command generator 530 based on the detected shape.

The current command generator 530 may generate the current command value I* based on the torque command value T* and the phase θ of the ripple voltage Vdc.

The voltage command generator 540 may generate the first voltage command value V*1 based on the current command value I* and the ripple voltage Vdc. In particular, the voltage command generator 540 may include a voltage limiter (not shown) for limiting the size of the first voltage command value V*1 based on the ripple voltage Vdc.

The voltage limiter (not shown) limits the size of the first voltage command value V*1 based on an average value of the DC voltage Vdc in the first mode. However, in the second mode, the voltage limiter may limit the size of the first voltage command value V*1 based on an instantaneous value of the ripple voltage Vdc.

The power command generator 520 generates the instantaneous power command value Pinv_ref of inverter power based on Expressions 1 to 3 above. In FIG. 12, although the instantaneous power command value is indicated by P*, P* may have the same meaning as Pinv_ref.

Then the power controller 525 may generate a compensation voltage command value V*2 based on the instantaneous power command value P*. In more detail, the power controller 525 may generate the compensation voltage command value V*2 based on the instantaneous power command value P* and power Po consumed by the motor 250. The compensation voltage command value V*2 may be referred to as a second voltage command value V*2.

The adder 555 adds and outputs the first voltage command value V*1 and the second voltage command value V*2. That is, an inverter output voltage command value V*3 is output as a third voltage command value.

The switching control signal output unit 560 may generate and output the switching control signal Sic based on the third voltage command value V*3.

In the end, in the second mode, the inverter controller 23 may generate and output the switching control signal Sic based on the instantaneous power command value Pinv_ref of inverter power to control the inverter 220.

In this case, the instantaneous power command value Pinv_ref of inverter power may be generated based on the reference power Pinv_min and the average power command value Pavg of inverter power, as described above.

As such, the compressor motor driving device 200 including a low-capacitance capacitor C and the boost converter 420 may be driven in consideration of the instantaneous power command value Pinv_ref of inverter power so as to be stably driven with respect to a load.

In particular, despite a ripple voltage between opposite ends of a capacitor, a driving range with respect to a load may be expanded. Thus, driving efficiency of the motor driving device may be enhanced.

As described above, according to another embodiment of the present invention, it may be possible to operate the compressor motor driving device 200 only in the second mode. That is, it may be possible to operate the compressor motor driving device 200 only in the second mode without the first mode.

Thus the ripple frequency fevpk of the peak values Vpk_a, Vpk_b, Vpk_c, Vpk_d, Vpk_e, and Vpk_f of the three-phase currents Ia2, Ib2, and Ic2 flowing in the motor is twice the frequency fvac of the input AC power, as illustrated in FIG. 16B.

According to an embodiment of the present invention, a motor driving device and an air conditioner including the same may include a rectifier to rectify input AC power, a boost converter to boost and to output the power rectified by the rectifier, and an inverter including a plurality of switching devices and to output converted AC power to a motor using a voltage of the boost converter, thereby enhancing a voltage utilization ratio of a voltage input to the inverter in the motor driving device using a low-capacitance capacitor.

The inverter may use a voltage boosted by the boost converter, thereby reducing torque ripple during motor driving.

In addition, the boost converter may be used, thereby improving a power factor.

According to another embodiment of the present invention, a motor driving device and an air conditioner including the same may include a rectifier to rectify input AC power, a boost converter to boost and to output the power rectified by the rectifier, a capacitor to store a ripple voltage output from the boost converter, an inverter including a plurality of switching devices and to output converted AC power using the ripple voltage, and a converter controller to control the boost converter so as to reduce a peak value of the ripple voltage using a higher harmonic corresponding to a phase of the input voltage, thereby reducing a maximum voltage of a DC terminal in the motor driving device using the boost converter and the low-capacitance capacitor.

Accordingly, durability with respect to a circuit device in the motor driving device may be enhanced.

In addition, a maximum value of phase current flowing in a motor may be reduced to reduce iron loss and copper loss of the motor, thereby enhancing motor driving efficiency.

According to another embodiment of the present invention, a motor driving device and an air conditioner including the same may include a rectifier to rectify input AC power, a boost converter to boost and to output the power rectified by the rectifier, a capacitor to store a ripple voltage output from the boost converter, an inverter including a plurality of switching devices and to output converted AC power using the ripple voltage, and a controller for controlling the inverter to maintain a peak value of three-phase current flowing in the motor when inverter power for driving the motor is less than reference power and controlling the inverter to operate in a second mode in which a ripple frequency of the peak value of the three-phase current flowing in the motor is twice a frequency of the input AC power when the inverter power is the reference power or more, thereby achieving stable driving with respect to a load in the motor driving device and the air conditioner including the same using the boost converter and the low-capacitance capacitor.

According to another embodiment of the present invention, when the inverter power for driving the motor is less than the reference power, the controller controls the inverter based on an average power command value of the inverter power in the first mode, and when the inverter power is the reference power or more, the controller controls the inverter based on an instantaneous power command value of the inverter power in the second mode, thereby achieving stable driving with respect to a load in the motor driving device and the air conditioner including the same using the boost converter and the low-capacitance capacitor.

In particular, despite a ripple voltage between opposite ends of a capacitor, a driving range with respect to a load may be expanded. Thus, driving efficiency of the motor driving device may be enhanced.

According to another embodiment of the present invention, the controller may control the inverter such that a ripple frequency of the peak value of the three-phase current flowing in the motor is twice a frequency of the input AC power, thereby achieving stable driving with respect to a load in the motor driving device and the air conditioner including the same using the boost converter and the low-capacitance capacitor.

A voltage utilization ratio of a voltage input to the inverter in the motor driving device using a low-capacitance capacitor may be enhanced.

The motor driving device and the air conditioner including the same according to the present invention are not limited to the configurations and methods of the above-described embodiments. That is, the above-described embodiments may be partially or wholly combined to make various modifications.

The motor driving device or the operating method of the air conditioner according to the present invention can also be embodied as processor readable code on a processor readable recording medium. The processor readable recording medium is any data storage device that can store data which can be read thereafter by a processor. Examples of the processor readable recording medium include read-only memory (ROM), random-access memory (RAM), magnetic tapes, floppy disks, optical data storage devices, carrier wave such as transmission via the Internet, etc. The processor readable recording medium can also be distributed over network coupled computer systems so that the processor readable code is stored and executed in a distributed fashion.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A motor driving device comprising:
a rectifier to rectify inputted alternating current (AC) power;
a boost converter to boost and to output the power rectified by the rectifier;
an inverter comprising a plurality of switching devices to output converted AC power to a motor using a voltage from the boost converter;
a capacitor disposed between the boost converter and the inverter to store a ripple voltage outputted from the boost converter; and
an inverter controller to control the inverter to operate in a first mode in which a peak value of three-phase current flowing in the motor is constant when inverter power for driving the motor is less than reference power, and to control the inverter to operate in a second mode in which a ripple frequency of the peak value of the three-phase current flowing in the motor is twice a frequency of the input AC power when the inverter power is the reference power or more,
wherein, in the first mode, the peak value of three-phase current flowing in the motor has a first level higher than zero value,
wherein, in the second mode, the peak value of three-phase current flowing in the motor is not constant.

2. The motor driving device according to claim 1, further comprising:
a converter controller to control the boost converter to reduce a peak value of the ripple voltage using a higher harmonic compared with a fundamental wave of an input voltage, the higher harmonic corresponding to a phase of the input voltage.

3. The motor driving device according to claim 2, wherein the converter controller comprises:
a current command generator to generate a higher harmonic generated to correspond to the phase of the input voltage and to generate a current command value using the generated higher harmonic;
a voltage command generator to generate a voltage command value based on input current corresponding to the input AC power and the current command value; and
a switching control signal output unit to output the converter switching control signal based on the voltage command value.

4. The motor driving device according to claim 3, wherein the current command generator comprises:
a voltage controller to perform voltage control based on the ripple voltage; and
a higher harmonic generator to generate the higher harmonics corresponding to the phase of the input voltage.

5. The motor driving device according to claim 2, wherein the converter controller generates a second order higher harmonic and a third order higher harmonic compared with the fundamental wave of the input voltage.

6. The motor driving device according to claim 5, wherein the converter controller generates the second order higher harmonic and the third order higher harmonic so as to increase coefficients of the second order higher harmonic and the third order higher harmonic in order to reduce the peak value of the ripple value.

7. The motor driving device according to claim 4, wherein the voltage controller generates the voltage command value based on a root mean square (RMS) of the ripple voltage and the ripple voltage command value.

8. The motor driving device according to claim 4, wherein:

the converter controller further comprises a ripple voltage compensator to compensate for the ripple voltage to output a ripple voltage compensation value; and the converter controller outputs the converter switching control signal based on the voltage command value and the ripple voltage compensation value.

9. The motor driving device according to claim 1, wherein, in the second mode, the peak value of three-phase current flowing in the motor tracks the ripple voltage of the capacitor.

10. The motor driving device according to claim 1, wherein:

the inverter controller controls the inverter based on an average power command value of the inverter power in a first mode period; and the inverter controller controls the inverter based on an instantaneous power command value of the inverter power in a second mode period.

11. The motor driving device according to claim 10, wherein:

the inverter controller calculates a size of the instantaneous power command value based on the average power command value and the reference power; and the inverter controller calculates or detects a phase of the instantaneous power command value compared with a ripple voltage or input power based on the input AC power.

12. The motor driving device according to claim 11, wherein the phase of the instantaneous power command value is reduced as an average power value of the inverter power or a size of the inverter power is increased.

13. The motor driving device according to claim 10, wherein the inverter controller comprises:

a torque command generator to generate a torque command value based on a speed command value;

a current command generator to generate a current command value based on the torque command value;

a voltage command generator to generate a voltage command value based on the current command value;

a power command generator to generate the instantaneous power command value;

a power controller to generate a compensation voltage command value based on the instantaneous power command value; and a switching control signal output unit to output a switching control signal based on the voltage command value and the compensation voltage command value.

14. An air conditioner comprising:

a compressor to compress refrigerant;

a heat exchanger to perform heat exchange using the compressed refrigerant; and a compressor motor driving device to drive a motor in the compressor, wherein the compressor motor driving device comprises:

a rectifier to rectify inputted alternating current (AC) power;

a boost converter to boost and to output the power rectified by the rectifier;

an inverter comprising a plurality of switching devices to output converted AC power to the motor using a voltage from the boost converter;

a capacitor disposed between the boost converter and the inverter to store a ripple voltage outputted from the boost converter; and an inverter controller to control the inverter to operate in a first mode in which a peak value of three-phase current flowing in the motor is constant when inverter power for driving the motor is less than reference power, and to control the inverter to operate in a second mode in which a ripple frequency of the peak value of the three-phase current flowing in the motor is twice a frequency of the input AC power when the inverter power is the reference power or more, wherein, in the first mode, the peak value of three-phase current flowing in the motor has a first level higher than zero value, wherein, in the second mode, the peak value of three-phase current flowing in the motor is not constant.

* * * * *